United States Patent
Chainani et al.

(10) Patent No.: US 11,093,485 B2
(45) Date of Patent: Aug. 17, 2021

(54) BRANCH-BASED RECOVERY IN A DATABASE SYSTEM

(71) Applicant: Salesforce.com, Inc., San Francisco, CA (US)

(72) Inventors: Mikhail Chainani, San Francisco, CA (US); Xiaodan Wang, Dublin, CA (US); Vijayanth Devadhar, Fremont, CA (US)

(73) Assignee: Salesforce.com, Inc., San Francisco, CA (US)

( * ) Notice: Subject to any disclaimer, the term of this patent is extended or adjusted under 35 U.S.C. 154(b) by 169 days.

(21) Appl. No.: 16/552,119

(22) Filed: Aug. 27, 2019

(65) Prior Publication Data

US 2021/0064601 A1   Mar. 4, 2021

(51) Int. Cl.
*G06F 16/00* (2019.01)
*G06F 16/23* (2019.01)
*G06F 16/215* (2019.01)

(52) U.S. Cl.
CPC ........ *G06F 16/2379* (2019.01); *G06F 16/215* (2019.01); *G06F 16/2343* (2019.01)

(58) Field of Classification Search
None
See application file for complete search history.

(56) References Cited

U.S. PATENT DOCUMENTS

| | | |
|---|---|---|
| 7,111,023 B2 | 9/2006 | Norcott |
| 8,793,691 B2 | 7/2014 | Devadhar |
| 8,838,526 B2 | 9/2014 | Devadhar |
| 8,875,152 B2 | 10/2014 | Devadhar et al. |
| 9,201,696 B2 | 12/2015 | Yang et al. |
| 9,229,793 B2 | 1/2016 | Devadhar |
| 9,268,605 B2 | 2/2016 | Wang et al. |
| 9,305,070 B2 | 4/2016 | Zhu et al. |
| 9,348,648 B2 | 5/2016 | Wang et al. |
| 9,519,547 B2 | 12/2016 | Devadhar |
| 9,529,626 B2 | 12/2016 | Wang et al. |
| 9,632,852 B2 | 4/2017 | Kwong et al. |
| 9,766,960 B2 | 9/2017 | Wang |
| 9,813,516 B2 | 11/2017 | Wang |
| 9,858,187 B2 | 1/2018 | Sundaravaradan et al. |
| 9,923,960 B2 | 3/2018 | Helmich et al. |
| 9,984,002 B2 | 5/2018 | Sundaravaradan et al. |

(Continued)

FOREIGN PATENT DOCUMENTS

CA   2883883 A1   3/2014

OTHER PUBLICATIONS

Oracle Database Advanced Application Developer's Guide, Dec. 2014.
Oracle Database Backup and Recovery User's Guide, Jun. 2010.

*Primary Examiner* — Bai D Vu
(74) *Attorney, Agent, or Firm* — Kwan & Olynick LLP

(57) ABSTRACT

A staging table created in a database system may store a snapshot of live database table captured prior to an unintended change to the live database table. One or more entries in the staging table may be updated to incorporate one or more intended changes to the live database table that occurred after the unintended change. The live database table may be updated by merging each of the updated entries from the staging table to the live database table. The updated database table may eliminate the unintended change.

20 Claims, 10 Drawing Sheets

(56) References Cited

U.S. PATENT DOCUMENTS

| | | |
|---|---|---|
| 9,990,400 B2 | 6/2018 | Sundaravaradan et al. |
| 10,013,294 B2 | 7/2018 | Kwong et al. |
| 10,013,501 B2 | 7/2018 | Sundaravaradan et al. |
| 10,019,297 B2 | 7/2018 | Helmich et al. |
| 10,140,153 B2 | 11/2018 | Wang |
| 10,169,090 B2 | 1/2019 | Wang |
| 10,334,033 B2 | 6/2019 | Helmich et al. |
| 2014/0075017 A1 | 3/2014 | Wang et al. |
| 2015/0046279 A1 | 2/2015 | Wang |
| 2015/0052108 A1* | 2/2015 | Volk .................... G06F 16/2329 707/649 |
| 2015/0326650 A1 | 11/2015 | Yang et al. |
| 2016/0080273 A1 | 3/2016 | Yang et al. |
| 2016/0119244 A1 | 4/2016 | Wang et al. |
| 2016/0119246 A1 | 4/2016 | Wang |
| 2018/0063271 A1 | 3/2018 | Wang |
| 2018/0322306 A1 | 11/2018 | Obembe et al. |
| 2018/0329793 A1 | 11/2018 | Obembe et al. |
| 2018/0331887 A1 | 11/2018 | Obembe et al. |
| 2019/0057133 A1 | 2/2019 | Chainani et al. |
| 2019/0065542 A1 | 2/2019 | Baker et al. |
| 2019/0095249 A1 | 3/2019 | Wang |
| 2019/0235895 A1 | 8/2019 | Ovesea et al. |
| 2019/0235918 A1 | 8/2019 | Liu et al. |
| 2019/0236150 A1 | 8/2019 | Zaslaysky et al. |
| 2019/0236201 A1 | 8/2019 | Wang et al. |

\* cited by examiner

BRANCH-BASED RECOVERY IN A DATABASE SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to database systems and more specifically to maintaining data integrity in database systems.

BACKGROUND

Database systems store tabularized data in one or more tables. These database tables are updated via database scripts or application procedure interface (API) calls from applications. In some instances, a change to a database table may be unintended. For example, an application error or a malicious action may lead to the insertion, deletion, or alteration of data that is inconsistent with the intentions of a database user and/or administrator.

Unintended changes to a database system can create significant problems. For example, an unintended change to a user permissions table may result in unintentionally elevated user permissions, creating a security risk. As another example, valid data may be unintentionally overwritten.

Unintended changes may be reversed by restoring a database to an earlier state. However, an unintended change may be followed or preceded by one or more intended changes. In that case, restoring the database to a state prior to the unintended change may effectively eliminate one or more intended changes, thus creating additional problems.

BRIEF DESCRIPTION OF THE DRAWINGS

The included drawings are for illustrative purposes and serve only to provide examples of possible structures and operations for the disclosed inventive systems, apparatus, methods and computer program products for branch-based recovery in a database system. These drawings in no way limit any changes in form and detail that may be made by one skilled in the art without departing from the spirit and scope of the disclosed implementations.

DETAILED DESCRIPTION

Figure 1:
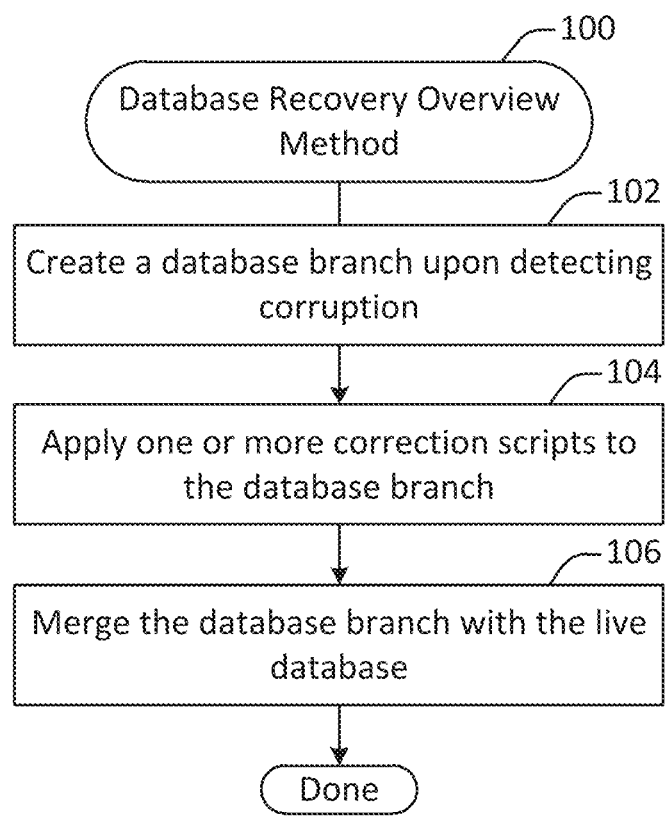
FIG. 1 illustrates a database recovery overview method, performed in accordance with one or more embodiments.

Techniques and mechanisms described herein provide for a general-purpose logical data recovery service in a database system. Characteristics of the service may include, but are not limited to: automation, testing, and execution of data recovery workflows at scale. In particular embodiments, the service may be employed in a multi-tenant and/or dynamic schema database system. For example, the service may allow for surgical, tenant-specific recovery workflows that do not impact other tenants.

According to various embodiments, the service may provide for one or more of a variety of capabilities. For example, to simplify recovery for non-database experts, the service may allow data recovery workflows to be assembled in a declarative, policy-driven manner. As another example, the service may include a branch-apply-merge abstraction to help developers isolate and reason about each phase of data recovery. As yet another example, the service may provide recovery APIs to quickly assemble solutions for each phase. Once a solution is assembled, developers may construct templates so that recovery workflows can be repeated consistently in multiple locations and reused in future incidents. As still another example, customer exposure to data loss may be minimized by integrating change data capture so that customer changes are replayed.

In some implementations, techniques and mechanisms described herein can be used to mitigate the impact of logical data corruption. Logical data corruption can be introduced to a database, for instance, through a bug in an application or database script or through malicious database interactions. Such corruption can be devastating, particularly in systems where resources are shared across a large organization or across multiple organizations (e.g., multi-tenant systems). The impact of logical corruption can rapidly cascade across a system and erode user and/or customer trust. Unfortunately, despite implementing sophisticated process and technology safeguards to prevent logical corruption, mistakes occasionally happen. However, conventional tools do not provide an end-to-end recovery service that is able to recover data associated with potentially many different tables, rows, and organizations that reside in a complex database system.

According to various embodiments, techniques and mechanisms described herein provide for improved usability, integration, testability, and scaling when addressing logical data corruption. Using these techniques and mechanisms, the time required to debug, assemble, and execute recovery solutions in response to data corruption incidents may be significantly reduced in comparison to conventional techniques. The data recovery service may include, but is not limited to, features such as a declaratively and policy driven framework for data recovery, a branch-apply-merge abstraction for data recovery, a reusable and repeatable recovery workflow patterns using parameterized templates and workflow classification, a surgical and tenant specific recovery workflow in a multi-tenant system, recovery APIs for workflow assembly, and/or novel integration and application of change data capture technologies to data recovery to minimize data loss and inconsistency.

In some implementations, one or more of the operations shown herein may be implemented via a templating system. For example, a database administrator may manually create a series of correction operations involving branching, correcting, and merging a database, for instance when first confronted with a new type of corruption event. Then, the procedure may be stored as a template for automated application in the event of future corruption events.

Consider the example of Alex, a database administrator in a database system. Alex discovers that a particular database script resulted in unintended changes to a database table. However by the time that Alex discovers the problem, subsequent updates have applied intended changes to the database table. When using conventional techniques undoing the unintended changes will be difficult. If Alex locks the database table to initiate repairs, then one or more organizations would lose access to the live database table. Rolling back the database table to before the unintended change would eliminate the subsequent intentional changes. However, manually editing the database table and leaving the subsequent updates intact risks introducing new logical corruption errors.

In contrast to conventional approaches, techniques and mechanisms described herein allow Alex to quickly and efficiently address the problem. First, she can create a branch of the database table from a time prior to the unintended change. She can then apply one or more correction scripts to the database table branch. After applying such changes, she can compare the branched database table to the live database table. If necessary, she can iteratively apply changes and examine the effect of those changes. When she is satisfied, she can merge the branched database table with the live version. Finally, she can store the series of operations used to correct the corruption as a template or schema for later use in the event of a subsequent, similar problem. In this way, access to the database table is not disrupted for the end user, and subsequent intentional changes to the database table are maintained. Thus, Alex can surgically correct the unintended changes with minimal impact to the end user.

FIG. 1 illustrates a database recovery overview method 100, performed in accordance with one or more embodiments. In some implementations, the method 100 may be performed at one or more computing devices within an on-demand computing services environment. For instance, the method 100 may be performed at a database system. Examples of computing services environments and computing devices are discussed throughout the application, for instance with respect to FIGS. 8, 9, and 10.

At 102, a database branch is created upon detecting corruption to a live database table. According to various embodiments, the database branch may be created by copying a version of the live database table to a staging table. For example, the live database table may be copied from a backup captured before the corruption event occurred. The creation of a database branch is discussed in further detail with respect to the method 300 shown in FIG. 3.

One or more correction scripts are applied to the database branch at 104. According to various embodiments, the one or more correction scripts may be designed to reverse one or more unintended changes associated with the corruption detected at operation 102. The correction of the database branch is discussed in additional detail with respect to the method 500 shown in FIG. 5.

The database branch is merged with the live database at 106. In some implementations, merging the database branch with the live database may involve operations such as resolving data conflicts between a live table and its associated staging table. The merging of a database branch with the live database is discussed in additional detail with respect to the method 600 shown in FIG. 6.

Figure 2:
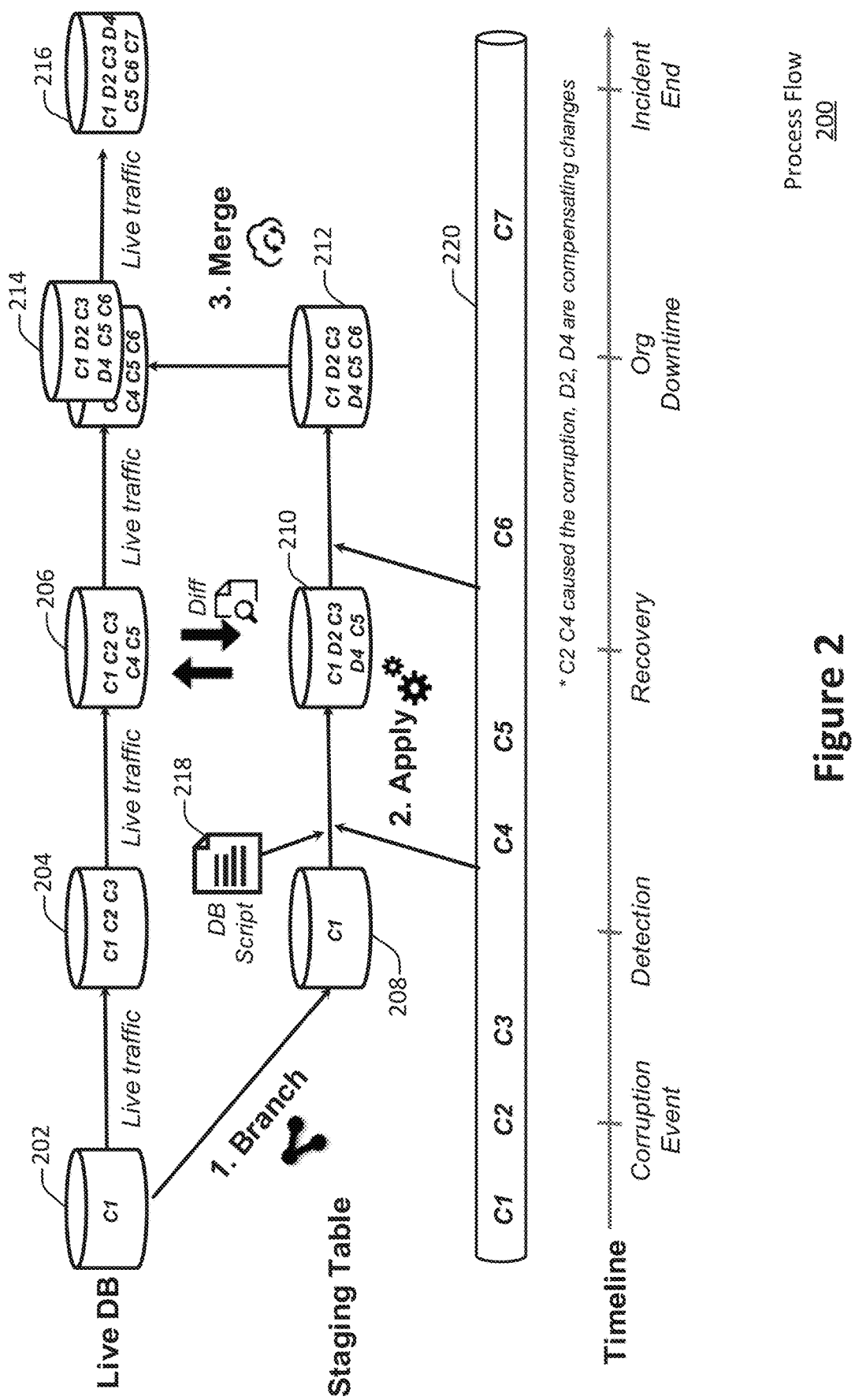
FIG. 2 illustrates a process flow, performed in accordance with one or more embodiments.

FIG. 2 illustrates a process flow 200, performed in accordance with one or more embodiments. The process flow 200 illustrates the application of techniques and mechanisms described herein to a particular example in a database system. However, it should be noted that the techniques and mechanisms described herein are applicable for addressing a wide variety of database system situations, and that the example process flow 200 is provided only for purpose of illustration.

At 202, a live database is in an intended state (i.e. C1). However, at database update C2, a corruption event occurs. The database update C2 may be an update to the database caused by a database script, an API call, or some other type of editing event. Further, the database update C2 may be caused by an application bug, an erroneous database script, a malicious attack, or any other type of situation.

Subsequent to the corruption event, an intended database change C3 is applied. The corruption even C2 is then detected. After the corruption event is detected when the database is in the state 204 a database branch is created at 208. The database branch is initialized with the snapshot C1, captured prior to the occurrence of the corruption event C2.

According to various embodiments, in the branch phase, the system may employ a point-in-time snapshot to extract a pre-corruption copy of the data, which corresponds to change C1 in FIG. 2. Data extraction can be targeted for a specific table or a specific entity, the difference being an entity is an object type that may span multiple tables. The data that extracted during the branch phase represent the last known good copy of the table or entity containing the corrupt data.

In some implementations, the extracted data is copied into one or more staging tables. Staging tables physically separate the extracted data from the live database and allows application teams to apply their fix without impacting production (e.g. unintentionally exposing an inconsistent state to customers). Once staging tables are populated, the system enters the Recovery Event on the timeline or the apply phase.

In some embodiments, after the database branch is created, intended updates may continue to be applied to the live database at 206, including the updates C4 and C5. At the same time, one or more database scripts 218 may be applied to reverse the change caused by the corruption event C2. Such scripts may be determined automatically, may be generated based on a template, or may be generated based on user input. For example, the database script may effectively replace the corruption event C2 with a replacement database update D2.

According to various embodiments, during the application process, subsequent changes may be applied to both the database branch and the live database. For example, the updates C4, C5, and C6 may be applied to both the database branch and the live database.

In a potentially iterative process, a comparison may be made between the branch that includes one or more staging tables, in the state indicated at 210, with the state of the live database at 206. Then, further updates may be made if desired. For example, a database script may effectively replace a subsequent edit C4 with a replacement database update D4.

In some implementations, in the apply phase, one or more administrators can reconcile and work on the staging table in order to fix the corruption. If the corresponding rows in the live database were simply replaced with the contents of the staging table, then customers may be exposed to a substantial amount of data loss (e.g., any customer changes between the Corruption Event and the Recovery Event could be lost). This loss can manifest as data inconsistency for customer data. The system allows administrators to leverage the change bus to reduce or eliminate the exposure to data inconsistency or loss. The term "change bus" refers to a system that maintains a record (e.g., an ordered list) of changes applied to the database system. For example, the system can replay changes captured from the live database against the stale copy of the data in the staging tables. In this way, staging tables may be gradually brought up-to-date. An example of a change bus is shown at 220 in FIG. 2.

According to various embodiments, the system also provides a declarative way for administrators to modify how changes are replayed. For example, if C2 includes an accidental deletion of a row, then the system can apply a compensating change (D2) that drops C2 on apply. In some implementations, the system supports execution of manually crafted database scripts during the Apply Phase. This support is helpful because it is difficult to foresee all use cases that lead to logical corruption.

In some embodiments, the system allows for the comparison of the contents of the staging table with the live database. In this way, administrators may evaluate the recovery operations and observe the recovery process.

When the database branch is suitable edited, it may reach a state at 212 at which point it is ready to be merged with the live database. The database branch 212 may then be merged with the live database at 214. For example, one or more values in the live database may be replaced with corresponding values in the database branch. As another example, one or more values in the live database may be deleted. As yet another example, one or more values in the branch may be added to the live database.

According to various embodiments, in the merge phase, the system integrates contents of the staging table into the live database. In the example shown in FIG. 2, the system locks the live database portion, provides a policy-based mechanism for copying rows from the staging table to the live database, and finally unlocks the live database portion. Merge policies allow application teams to define how to copy data (e.g. should the system purge the contents of the live database first?) and how to handle conflicts (e.g. keep the latest version of the row if there is a conflict).

After the merge is completed, then the branch may be closed, and operation of the live database may continue as normal at 216 with subsequent changes such as C7.

Figure 3:
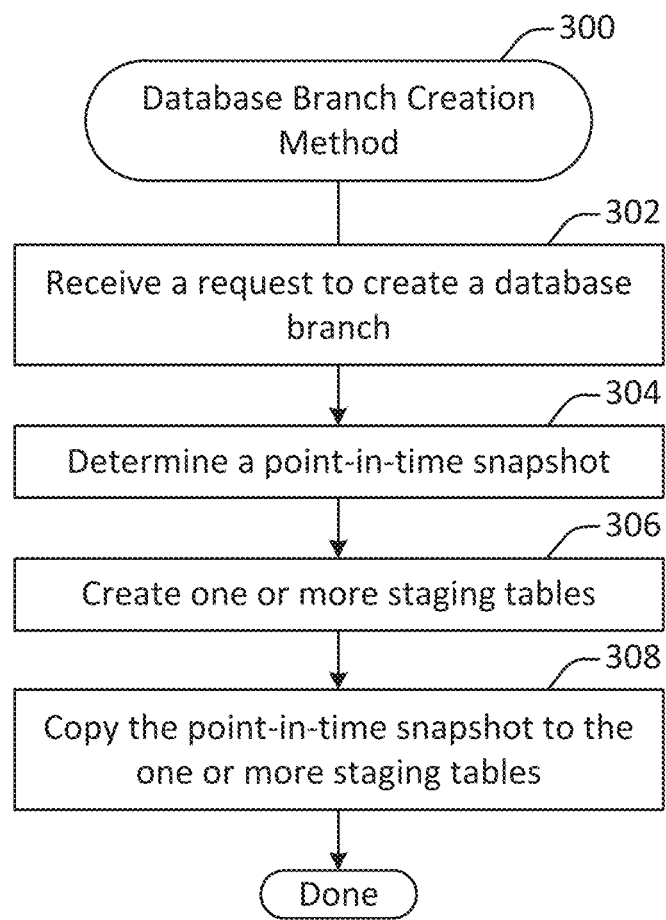
FIG. 3 illustrates a database branch creation method, performed in accordance with one or more embodiments.

FIG. 3 illustrates a database branch creation method 300, performed in accordance with one or more embodiments. In some implementations, the method 300 may be performed at one or more computing devices within an on-demand computing services environment. For instance, the method 300 may be performed at a database system. Examples of computing services environments and computing devices are discussed throughout the application, for instance with respect to FIGS. 8, 9, and 10.

Figure 4:
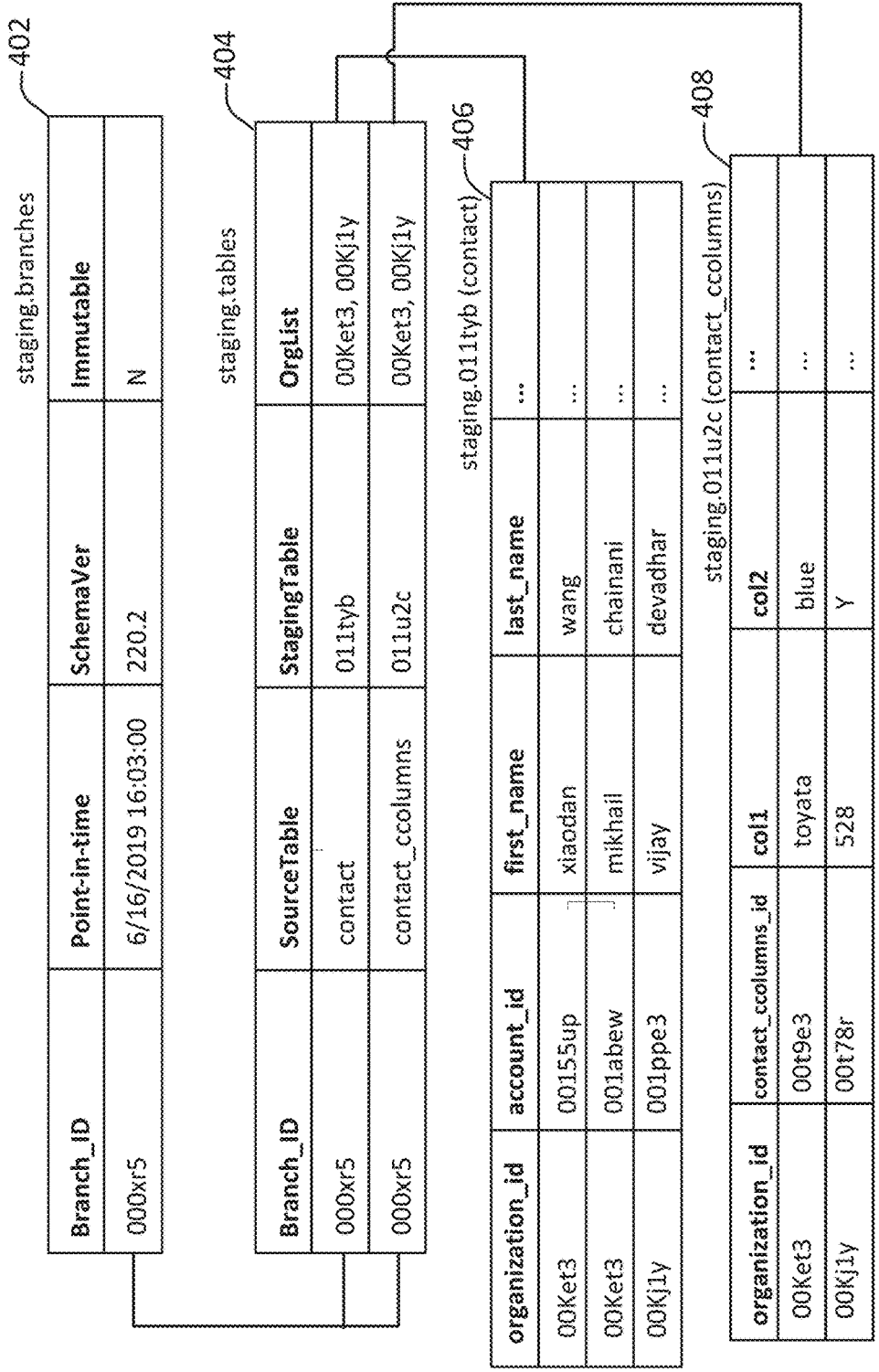
FIG. 4 illustrates an arrangement of data in a database system, configured in accordance with one or more embodiments.

FIG. 4 illustrates an arrangement of data 400 in a database system, configured in accordance with one or more embodiments. Portions of FIG. 3 are discussed with reference to the arrangement of data 400 shown in FIG. 4.

A request to create a database branch is received at 302. In some implementations, the request to create a database branch may be received as part of a larger process flow, such as the methods shown in FIGS. 1 and 7.

According to various embodiments, the request may be generated based on user input. For example, a database administrator may directly observe or receive a report of an unintended change to a database system. The administrator may then issue a request to branch the database.

In some implementations, the request may be generated automatically. For instance, the system may determine that a database table has entered into a corrupted or conflicted state. The system may then automatically generate a request to create a database branch, and then notify an administrator of the problem.

A point-in-time snapshot is determined at 304. According to various embodiments, the point-in-time snapshot may include a state of one or more database tables. For example, the database system may periodically capture snapshots for backup purposes. The point-in-time snapshot determined at 304 may be, for instance, a snapshot of one or more tables from a time shortly before an unintended change occurred.

In some implementations, the point-in-time snapshot may be determined based on user input. For example, a database administrator may select a particular snapshot from a number of available snapshots.

In some implementations, the point-in-time snapshot may be determined automatically. For example, the request to create the database branch may identify one or more tables that incurred unintended changes. The system may then select the most recent point-in-time snapshot from before the unintended change occurred.

The snapshot table 402 in FIG. 4 shows an example row that includes information about a snapshot. In this example, the snapshot associated with the database branch 000xr5 was captured at 16:03:00 on Jun. 16, 2019. The branch is not flagged as immutable, and is associated with the database table schema version 220.2. According to various embodiments, a schema version may identify characteristics of a table, such as column names and data types.

One or more staging tables are created at 306. According to various embodiments, a staging table may replicate the structure (e.g., columns) of a corresponding live table. Accordingly, creating a staging table may involve instantiating a database table based on a table definition associated with a live table.

The staging table status table 404 in FIG. 4 illustrates an example of two staging database tables associated with the database branch 000xr5. The two staging database tables are associated with the database table contact and contact_ccolumns. Further, the staging tables shown in FIG. 4 are limited to data associated with two different organizational identifiers.

The snapshot is copied to the staging table at 308. In some embodiments, creating a staging table may involve copying data associated with the point-in-time snapshot determined at 304 into the staging table. In some configurations, the staging table may represent a complete copy of the live table at a point in time.

In some implementations, only a portion of the data included in the live table may be copied. For example, a determination may be made that the unintended change affected only a portion of the table, such as one or more tenants, one or more data columns, one or more data rows, and/or one or more other portion discriminants. In such a situation, the staging table may be limited to a portion of the live table that includes the data affected by the unintended change.

The staging tables 406 and 408 shown in FIG. 4 illustrate examples of staging tables to which snapshot data has been copied. It should be noted that the arrangement of data 400 shown in FIG. 4 is provided for the purpose of illustration only, and that actual database tables may include many more columns and rows than that shown in FIG. 4.

Figure 5:
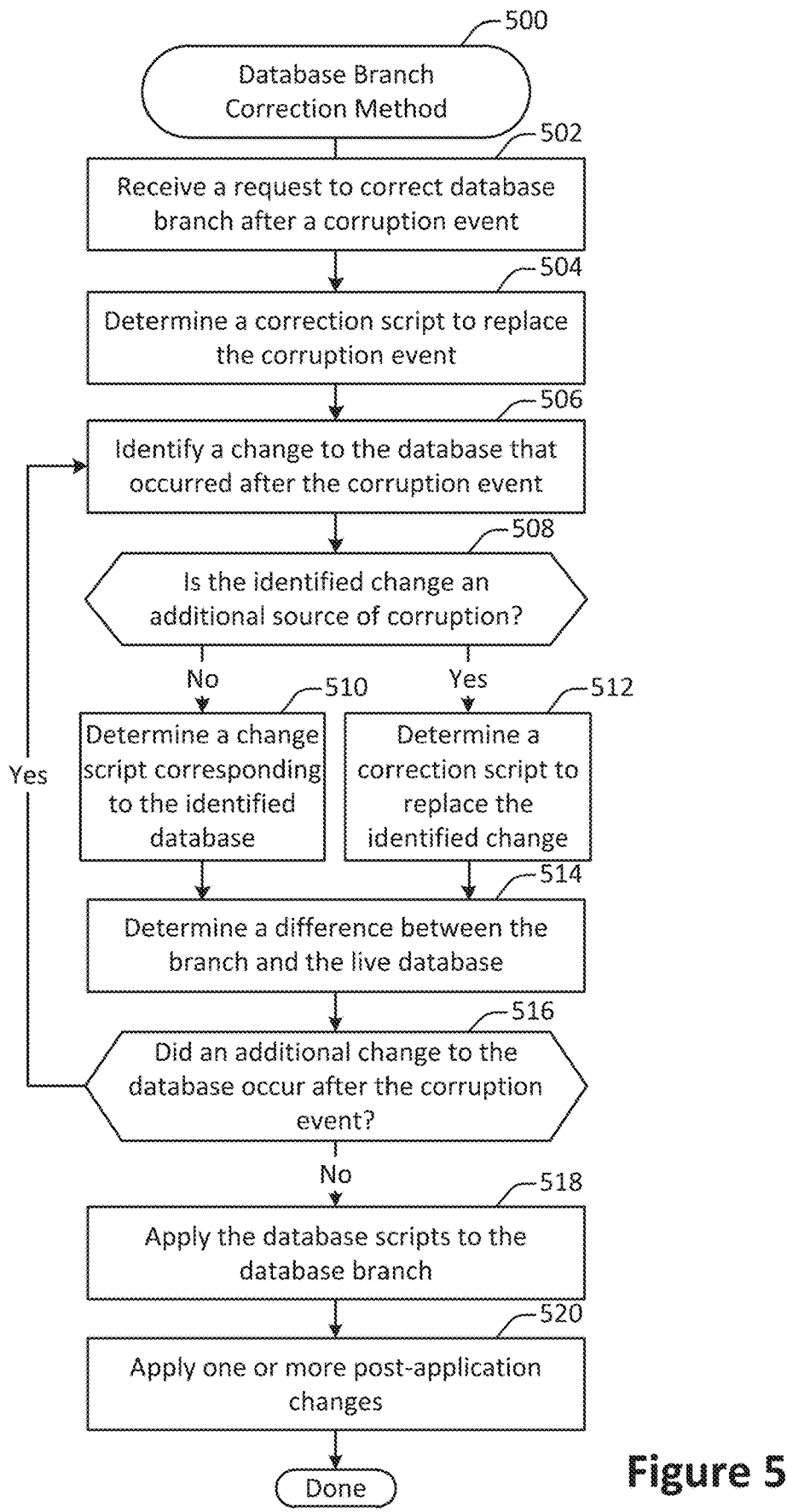
FIG. 5 illustrates a method for correcting a database branched, performed in accordance with one or more embodiments.

FIG. 5 illustrates a method 500 for correcting a database branched, performed in accordance with one or more embodiments. In some implementations the method 300 may be performed at one or more computing devices within an on-demand computing services environment. For instance, the method 300 may be performed at a database system.

A request to correct a database branch after a corruption event is received at 502. According to various embodiments, the request may be received as part of an overall workflow, such as the method 100 discussed with respect to FIG. 1.

A correction script to replace the corruption event is determined at 504. In some embodiments, such a script may be determined automatically, may be generated based on a template, or may be generated based on user input.

According to various embodiments, the correction script may be any suitable script applied in place of the change made by the corruption event. For example, the corruption event may be a database update that was substantially correct except for an extraneous, incorrect portion. In this example, the correction script may apply the same change as the corruption event, but with the extraneous, incorrect portion removed. As another example, the corruption event may include a database script or API call having an error such as one or more logical flaws or incorrect database values. In this example, the logical flaws or incorrect database values may be corrected, and the corrected database script or API call may be executed.

In some implementations operation 504 may be omitted. For example, if the corruption event represents a malicious attack or an entirely incorrect operation, then the change associated with the corruption event may simply be eliminated, and continued operations for correcting the database branch performed starting at operation 506.

At 506, a change to the database that occurred after the corruption event is identified. Examples of such a change are represented at C3, C4, C5, and C6 in FIG. 2. The set of changes that have occurred to the database may be referred to herein as a "change bus". In some implementations, the change may be identified by analyzing a log or record of changes made to the database. Such changes may be identified and processed in any suitable order, such as the chronological order in which they were initially applied to the database.

A determination is made at 508 as to whether the change is an additional source of corruption. According to various embodiments, the determination may be made based at least in part on user input. For example, a database administrator may evaluate the change to determine whether the change is intended. Alternately, or additionally, the determination may be made based at least in part on an automatic evaluation. For example, the system may flag the change as suspicious, and once flagged the change may be reviewed by an administrator.

In some implementations, a change may be flagged as suspicious based on heuristics or rules established by an administrator or determined dynamically based on past database activity. For example, a change may be flagged as suspicious when it changes a sensitive table such as a permissions table. As another example, a change may be flagged as suspicious when it inserts, deletes, or alters an unusually large number of rows. As yet another example, a change may be flagged as suspicious when it alters a table or tables in any manner that is inconsistent with, or unusual when compared to, past activity.

If the identified change represents an additional source of corruption, then a change script corresponding to the identified database change is determined at 510. In some implementations, the change script may be determined so as to replicate the identified change, subject to the correction script determined at 504 and any other intervening changes to the database. For example, in some configurations the change script may be determined by applying to the database branch the same script or API call that originally gave rise to the change identified at 506. As another example, if the identified database change made at 506 depended on the corruption event corrected at 504 then the identified database change may be replaced with a different change in a fashion similar to the determination of the correction script discussed at 504.

If instead the identified change represents an additional source of corruption, then a correction script is determined to replace the identified change at 512. According to various embodiments, the correction script may be determined in a manner similar to that discussed with respect to the operation 504.

A difference between the database branch and the live database is determined at 514. In some implementations, the difference may be determined by identifying additions, deletions, or updates present in the database branch relative to the live database. Such changes may include rows that are present in the database branch but that are not present in the live database, rows that are present in the live database but that are not present in the database branch and/or database values that differ between the database branch and the live database.

According to various embodiments, the difference between the database branch and the live database may be determined by performing a row-by-row comparison between the database branch and the live database. Such a comparison may be performed in sequence, in parallel, or in any suitable order.

A determination is made at 516 as to whether an additional change to the database occurred after the corruption event. As discussed with respect to operation 506, such changes may be identified and processed in any suitable order, such as the sequence with which they were originally applied to the live database.

When it is determined that additional changes to the database have been processed, then at 518 the database scripts are applied to the database branch. According to various embodiments, the database scripts may be applied to the database branch by executing the scripts determined at the operations 504, 510, and/or 512. Alternately, one or more of these scripts may be executed during the correction process itself, such as prior to operations 506 and 514.

One or more post-application changes are applied to the database branch at 520. According to various embodiments, the post-application changes may include any suitable operations determined by an administrator or the database system. For example, such changes may include one or more row insertion, row deletion, and/or data value update operations In some implementations, one or more of the operations shown in FIG. 5 may be performed automatically, for instance by the database system itself. Alternately, one or more operations may be performed based on input received from a user such as a database administrator. In some configurations, one or more operations may be performed based on a combination of user input and one or more actions determined or suggested by the database system.

According to various embodiments, one or more database branch correction operations may be performed in an order different than that shown in FIG. 5. For example, one or more operations may be performed in parallel.

In some implementations, one or more operations shown in FIG. 5 need not be performed for every database branch correction procedure. Alternately, or additionally, database branch correction may involve one or more operations not shown in FIG. 5. For example, a difference between the branch and the live database may not necessarily be determined. As another example, a difference between the branch and the live database may be performed after operation 502 to aid in the determination of the correction script at 504.

Figure 6:
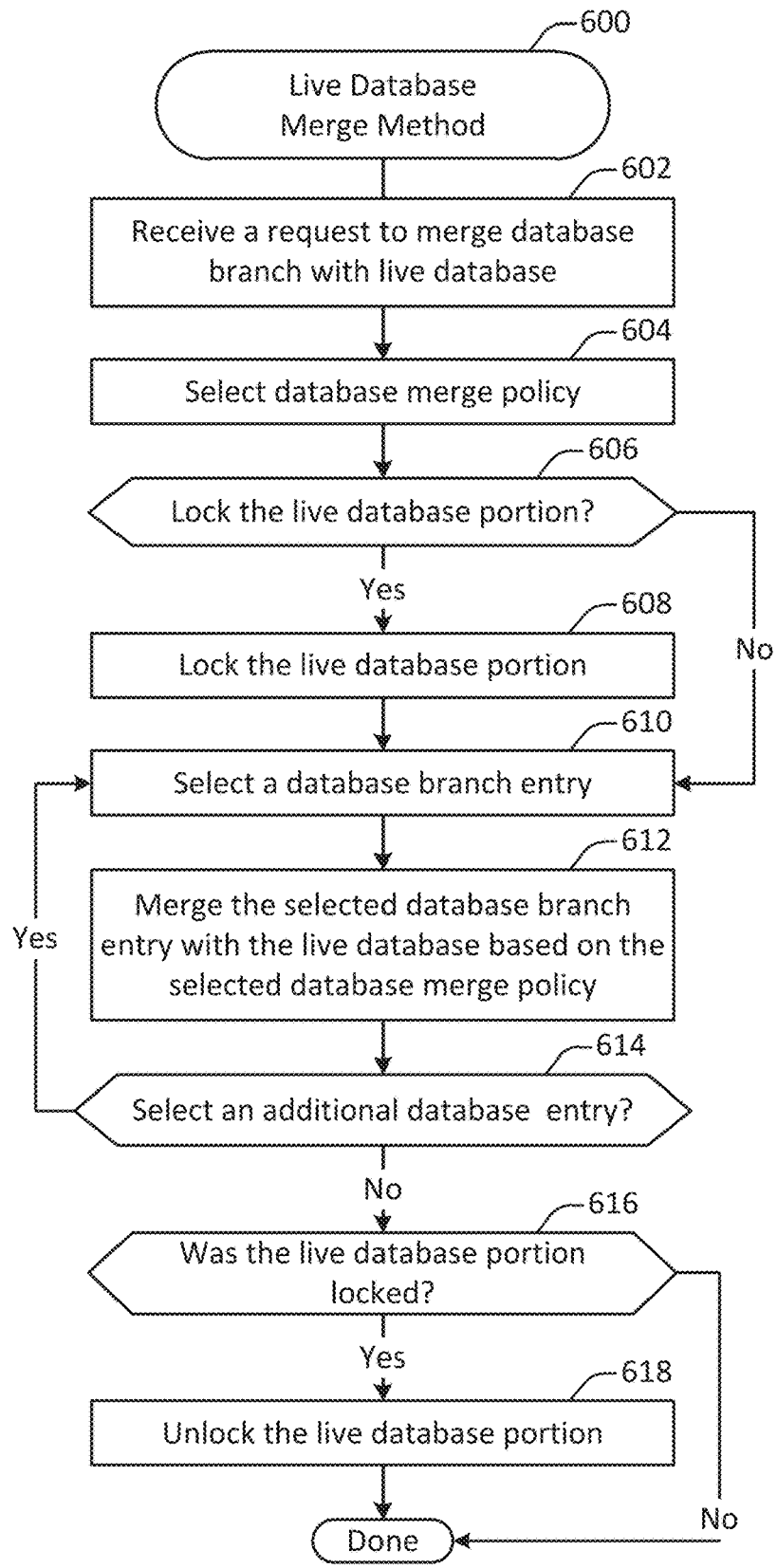
FIG. 6 illustrates a method for merging a database branch with a live database, performed in accordance with one or more embodiments.

FIG. 6 illustrates a method 600 for merging a database branch with a live database, performed in accordance with one or more embodiments. According to various embodiments, the method 600 may be performed at a database system after the database branch is corrected as described with respect to the method 500 shown in FIG. 5.

A request to merge the database branch with the live database is received at 602. According to various embodiments, the request may be received after the database branch is corrected. For example, as shown in FIG. 2, the request may be received at 212 after one or more database correction operations have been performed.

A database merge policy is selected at 604. According to various embodiments, the database merge policy may specify how to resolve conflicts between the live database and the database branch. Such conflicts may include rows that are present in the live database but not in the database branch, rows that are present in the database branch but are not present in the live database, or data values that differ between the database branch and the live database.

In some implementations, various types of database merge policies are possible. The database policy may specify, for instance, whether to delete extra rows in the live database, whether to insert new rows in the live database, and/or whether to update values in the live database.

In some embodiments, database merge policies may be specified in a granular fashion. For example, different object types, organizations, or row characteristics may be associated with different database merge policies.

In some implementations, one type of policy may specify one or more actions that are not specific to a particular row. Under a "drop live" policy, all rows on the live database portion are deleted before copying rows from the staging table.

According to various embodiments, one type of policy may specify when to copy a row from the staging table to the live table. Under a "copy if present" policy, the system copies from the staging table if a row with a matching primary key is found in the live database. Under a "copy if absent" policy, the system copies from the staging table if a row with a matching primary key is not found in the live database. Under a "copy all" policy, the system copies all rows from the staging table to the live database.

According to various embodiments, one type of policy may specify how to resolve conflicts between tables. Under a "keep staging" policy, if the staging and live data rows collide on a unique index, then the live row is deleted and the row from the staging table inserted. Under a "keep live" policy, if the staging and live data rows collide on a unique index, then the staging table row is not copied. Under a "keep latest" policy, if the staging and live data rows collide on a unique index, then the row with the later timestamp may be kept.

According to various embodiments, database merge policies may be specified based on user input. For example, an administrator may manually set a database merge policy as part of the correction process. Alternately, or additionally, the system may determine or suggest one or more database merge policies, for instance based on a database correction template or an evaluation of the number or type of changes being applied in the merge.

A determination is made at 606 as to whether to lock the live database portion corresponding to the database branch. In some implementations the live database portion may be locked in any of various circumstances. For example, the live database portion may be locked when the number or percentage of rows that differ between the live database and the database branch exceeds a designated threshold. As another example, the live database portion may be locked when the live database portion includes particularly sensitive data, such as permissions data.

In some implementations, the determination as to whether to lock the live database portion may be made based on user input. For instance, an administrator may identify whether to lock the live database portion. Alternately, or additionally, the determination as to whether to lock the live database portion may be made at least in part based on one or more rules or heuristics within the database system. For example, the system may automatically lock the live database portion when the number or percentage of rows to be updated during the merge exceeds a designated threshold.

At 608, if it is determined to lock the live database portion, then the live database portion is locked. According to various embodiments, locking the live database portion may involve preventing updates to the live database portion until the live database portion is unlocked. For example, requests to update the live database portion may be denied. As another example, requests to update the live database portion may be queued and executed only after the live database portion is unlocked.

A database branch entry is selected at 610. At 612 the selected database branch entry is then merged with the live database based on the selected merge policy. In some implementations, merging the selected database branch entry may involve inserting the selected database entry into the live database, deleting a database entry from the live database, or updating the live database based on the selected database branch entry.

At 614, a determination is made as to whether to select an additional database branch entry. Additional database branch entries may be selected until each entry has been processed. According to various embodiments, database branch entries may be selected in sequence, in parallel, or in any suitable order.

At 616, a determination is made as to whether the database portion was locked as discussed with respect to the operations 606 and 608. If the database portion was locked, then the database portion is unlocked at operation 618. Unlocking the database portion may involve opening the database portion for subsequent updates and/or executing one or more database updates that were received and queued after the database portion was locked.

Figure 7:
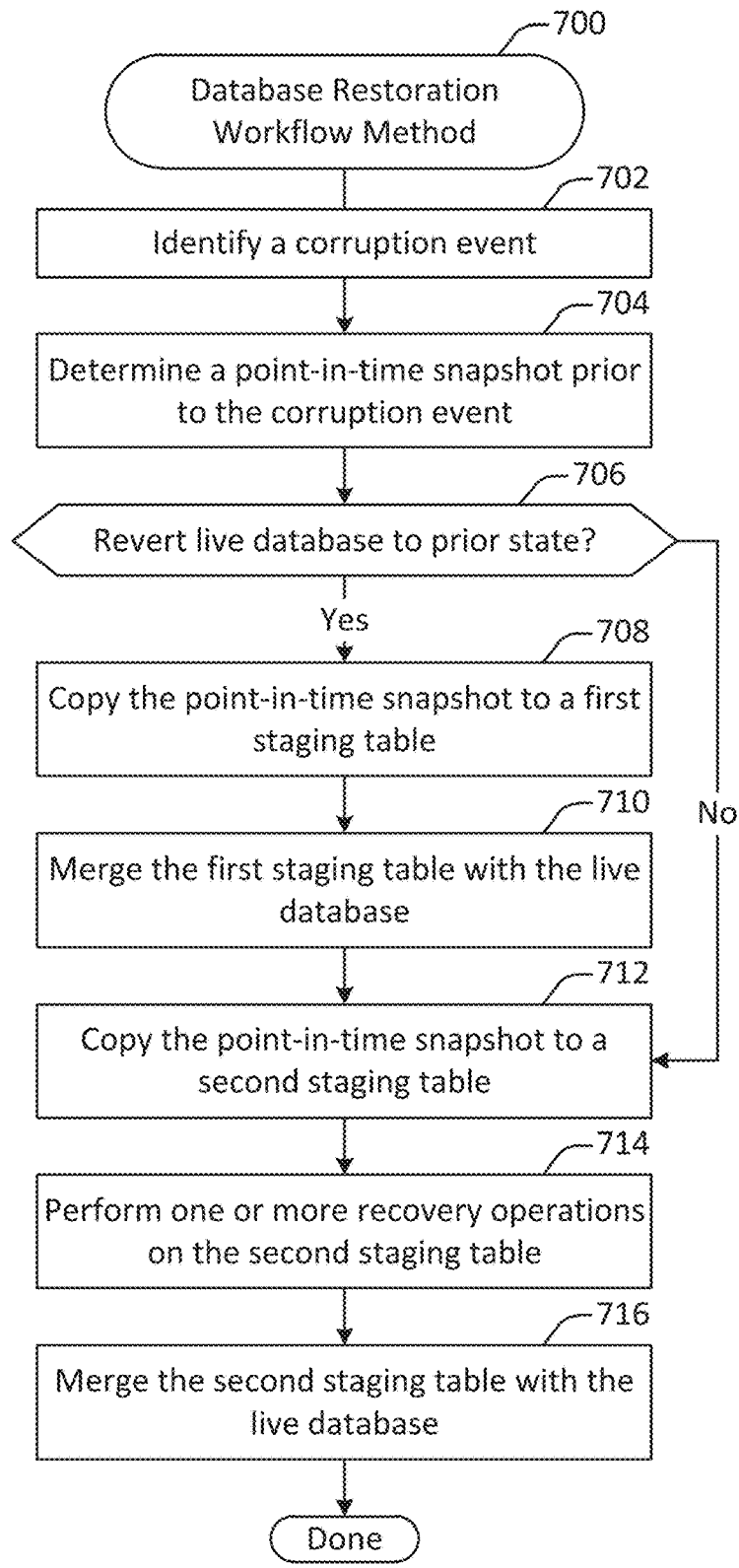
FIG. 7 illustrates a database restoration workflow method, performed in accordance with one or more embodiments.

FIG. 7 illustrates a database restoration workflow method, performed in accordance with one or more embodiments. In some implementations, the method 700 may be performed at one or more computing devices within an on-demand computing services environment. For instance, the method 700 may be performed at a database system.

The method 700 illustrates how various techniques described herein may be combined in particular orders to achieve specific aims. Techniques and mechanisms discussed with respect to the method 700 may be used in conjunction with techniques and mechanisms discussed elsewhere in the application, such as those discussed with respect to the methods 300, 500, and 600 shown in FIGS. 3, 5, and 6. Many of the operations shown in FIG. 7 are discussed in additional detail elsewhere herein and are discussed here in a more limited fashion to avoid duplication.

At 702, a corruption event is identified. At 704, a point-in-time snapshot prior to the corruption event is determined. A determination is made at 706 as to whether the revert the live database to a prior state. Reverting the live copy of the database to a prior state has the advantage that corrupted data is quickly removed from the live database. However, reverting the live copy of the database has the disadvantage that subsequent updates, received after the corruption event occurred but prior to the reversion of the database, may be lost.

In some implementations, the determination made at 706 may be based on the nature of the unintended change introduced by the corruption event. If the corruption event involved a relatively minor change to relatively low-priority data, then the live database may be left as-is. If instead the corruption event involved significant changes and/or changes to sensitive data, then the database may be reverted For example, if the corruption event erased postal addresses associated with user contacts, then the corruption event may be treated as a relatively low-impact and/or low-risk event, and the live database may be maintained in its current state while repairs are conducted. If instead the corruption event altered permissions data in a permissions table, then the corruption event may be treated as a relatively high-impact event resulting in a security risk, and the database may be reverted to the prior state.

As another example, if new corruption events are still being injected into the live database, the database may continue to be maintained in its current state. If instead the source of the corruption has been identified and eliminated, the database may be reverted to a prior state.

It should be noted that the entire database need not be reverted to a prior state. Instead, as discussed elsewhere herein, a portion of the database identified as including rows and/or or columns potentially or actually affected by the corruption event may be reverted. For instance, the reverted portion may be limited to one or more organizations, entity types, or entities.

In some implementations, the determination made at the operation 706 may be made at least in part based on user input. For example, a database administrator may indicate whether to revert the live database to a prior state.

In some embodiments, the determination made at the operation 706 may be made at least in part based on an automated evaluation by the system. For example, the system may flag the live database for reversion in the event that the corruption event involves a change to a sensitive table such as a permissions database table. As another example, the system may flag the live database for reversion in the event that the corruption event involves relatively many changes to the database, while subsequent changes to the database are relatively few in number.

When it is determined at 706 to revert the database, then at 708 a first staging table is created, and the point-in-time snapshot is copied to the first staging table. The first staging table is merged with the live database at 710, effectively reverting the live database to the prior state captured in the live snapshot.

A second staging table is created at 712, and the point-in-time snapshot is copied to the second staging table. One or more recovery operations are performed on the second staging table at 714. The second staging table is then merged with the live database at 716.

As discussed with respect to the method 500 shown in FIG. 5, performing the one or more recovery operations may require various operations and potentially some amount of time. By reverting the live database to the prior state at 706-710, these recovery operations may be performed while the live database is in a protected state, with the changes caused by the corruption event being entirely removed. However, intended changes to the database that were made after the corruption event may potentially still be captured and implemented during the recovery operation stage at 714.

According to various embodiments, one or more operations discussed herein may be exposed through an application procedure interface. Examples of API calls with associated parameters are presented in the paragraphs that follow:

Branch: branchId=Branch (<orgId>, <list of tables/entities>, <point-in-time>)
Branch: immutableBranchId=ImmutableBranch (<orgId>, <list of tables/entities>, <point-in-time>)
Branch: newBranchId=Branch (<branchId>)
Apply: Apply (<branchId>, <start point-in-time>, <declarative statement>)
Apply: Apply (<branchId>, <start point-in-time>, <end point-in-time>, <declarative statement>)
Apply: Apply (<branchId>, <DB script>)
Merge: Merge (<branchId>, <policy>)
Diff: diffId=Diff (<branchId>)
Lock: Lock (<list of orgIds>, <read-only>)
Unlock: Unlock (<list of orgIds>)

In some implementations, a branch API call may extract data for the specified organization, table, entities, and/or other parameters from a snapshot of the database defined by the point-in-time parameter. New staging tables for storing the extracted data may also be created. The set of staging table and related metadata can be uniquely identified by branchId.

In some embodiments an immutable branch may be created. An immutable branch may be identical to a mutable branch except its staging tables cannot be modified. Such an approach may be useful when, for example, a branch is converted for immediately reverting the live database to the point-in-time snapshot, prior to editing.

According to various embodiments, a branch may be created from an existing branch. Such an approach may be useful, for instance, when seeding a new, mutable branch from an immutable branch. As another example, such an approach may be useful to address errors inadvertently created during the apply phase. When such a problem is detected, a new editable branch can be created from the immutable branch to start fresh.

According to various embodiments, the apply API allows for replaying database changes (e.g., from the change bus) against the against the set of staging tables belonging to the branchId provided. The start point-in-time parameter defines the starting point for change replay. Changes may be applied from the start until current time. The declarative statement may be evaluated during the replay in order to modify how changes are applied.

In some embodiments, and end point-in-time can be specified to limit change replay to a specific time interval. An apply API call may also be used to apply a database script against the staging table.

In some implementations, the merge API may be used to integrate contents of the staging tables belonging to the specified branchId into the live database. A policy may define which rows are copied and how conflicts are handled.

According to various embodiments, the diff API may be used to compare the rows of the staging table with the corresponding rows in the live database. Results of dill may be stored and can be uniquely identified and retrieved using diffId.

In some implementations, the lock API may be used to block users from the list of orgs specified from accessing the application. If the read-only option is set, then read-only mode may be enabled to grant users read-only access to the portion of the live database affected by the unintended changes.

According to various embodiments, the unlock API may be used to re-open access to the application for the list of orgs specified.

Figure 8:
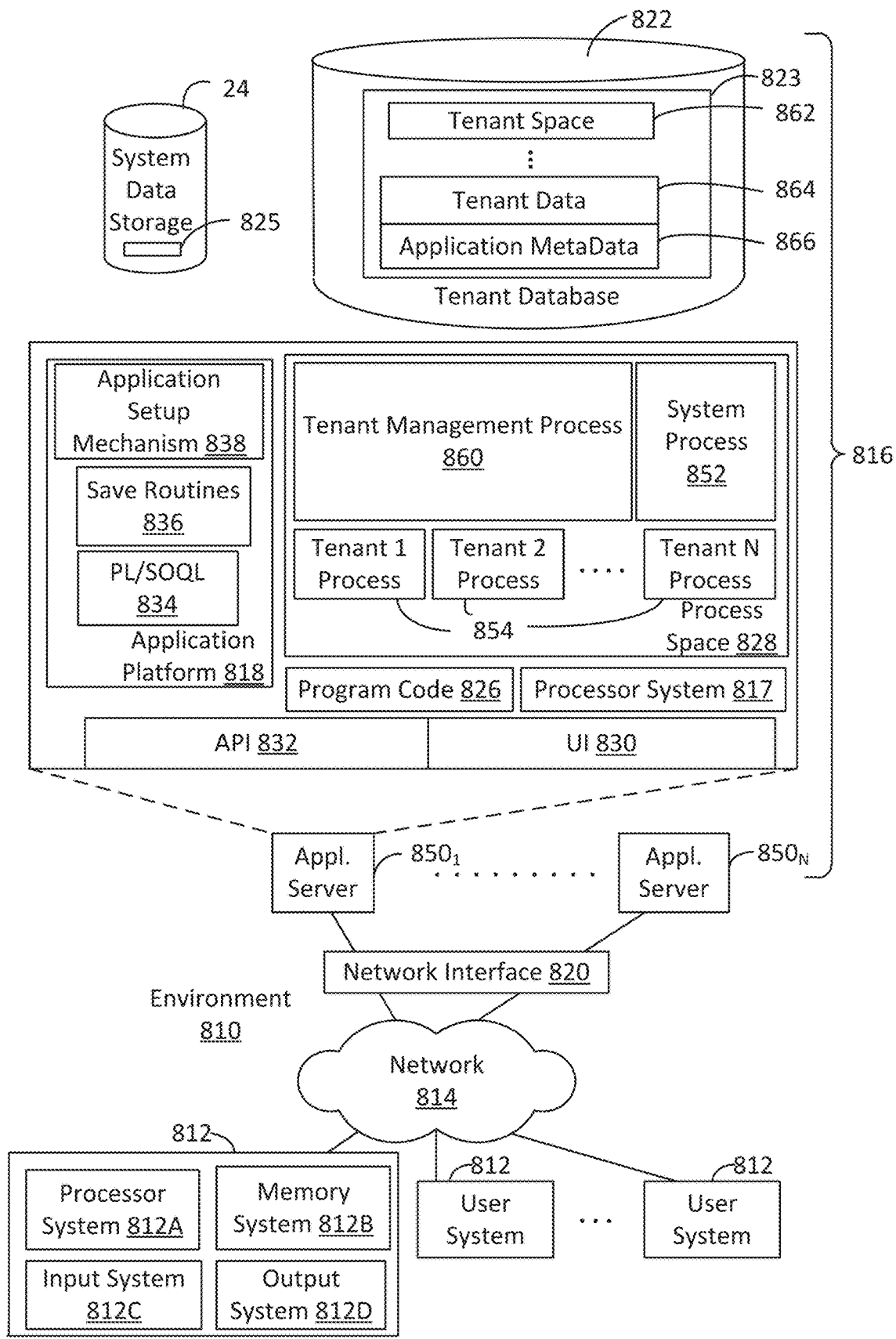
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin observed response time etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based CRM system. For example, in some implementations, system 816 may include application servers configured to implement and execute CRM software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
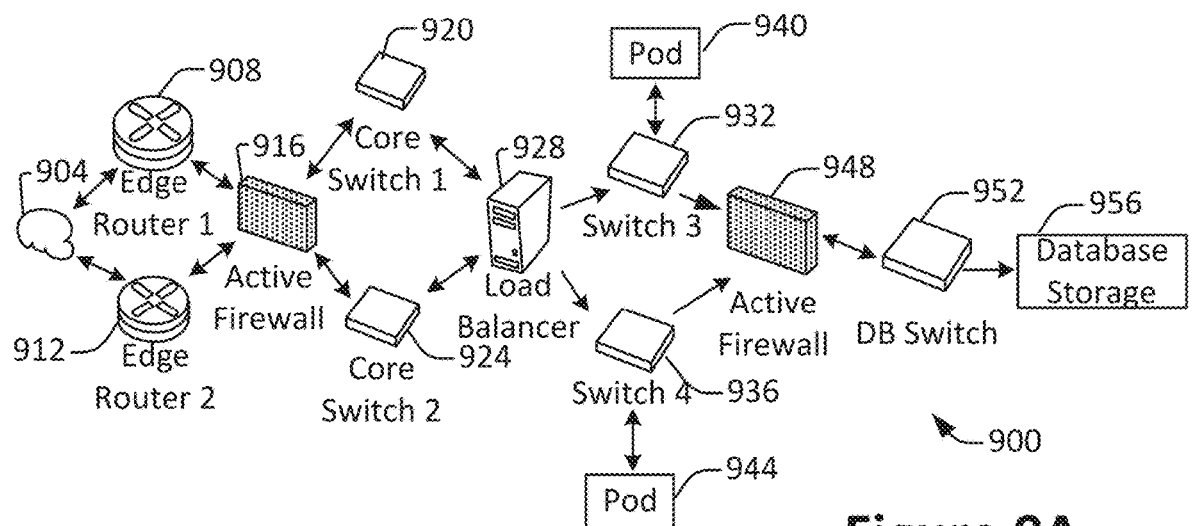
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems ?12 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process customer relations management information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
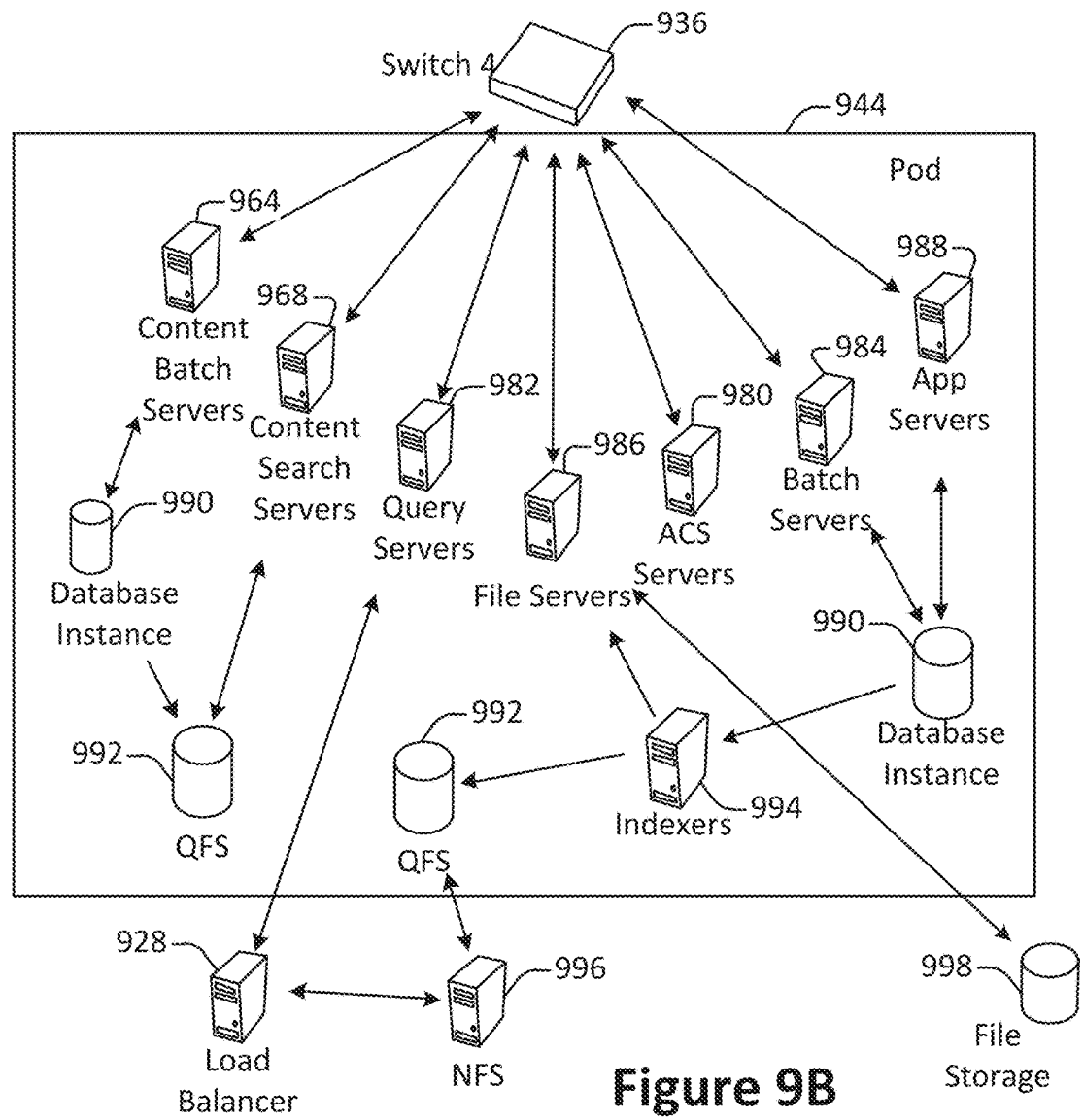
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968 query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
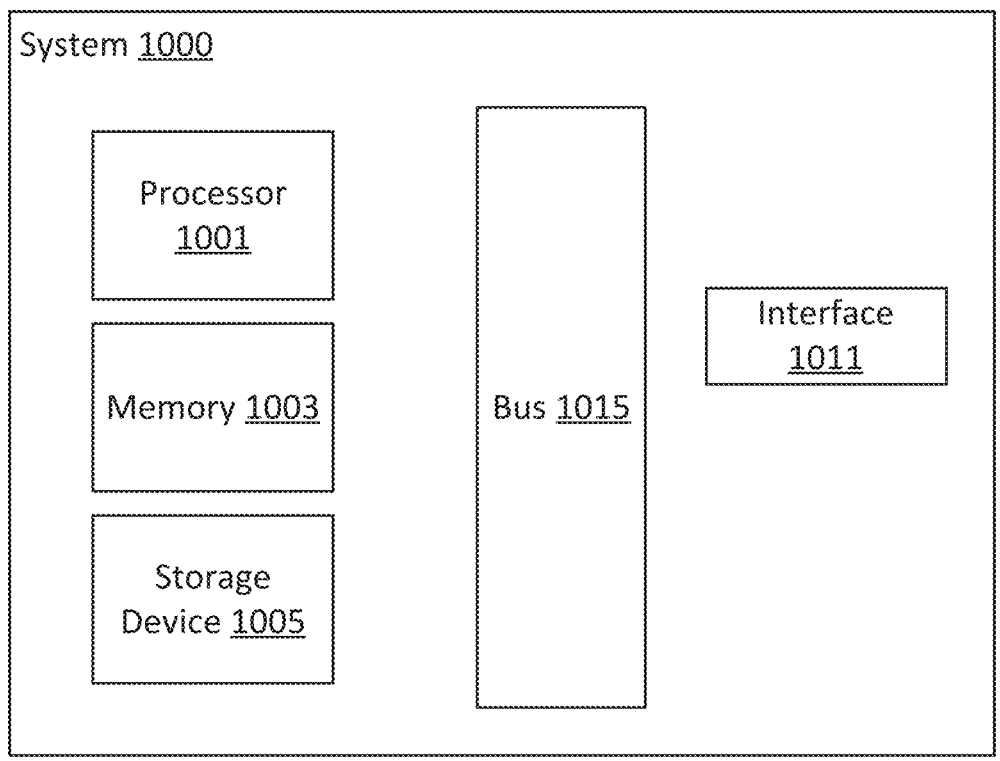
FIG. 10 illustrates one example of a computing device.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method implemented a database system, the method comprising:
   receiving via a communication interface a message identifying a designated change of a sequence of changes to a live database table as unintended;
   creating a staging table in the database system upon receiving the message, the staging table storing a snapshot of the live database table, the snapshot of the live database table being captured prior to the unintended change to the live database table;
   updating one or more entries in the staging table, the updated entries incorporating one or more intended changes to the live database table that occurred after the unintended change; and
   updating the live database table by merging each of the updated entries from the staging table to the live database table, the updated live database table eliminating the unintended change.

2. The method recited in claim 1, wherein updating the one or more entries comprises replaying an instruction transmitted via an application procedure interface and associated with one of the intended changes.

3. The method recited in claim 1, wherein updating the one or more entries comprises executing a database script associated with one of the intended changes.

4. The method recited in claim 1, the method further comprising:
   determining a logical difference between the live database table and the staging table, the logical difference identifying one or more data rows that differ between the live database table and the staging table.

5. The method recited in claim 1, the method further comprising:
   applying to the staging table a database branch correction script, the database branch correction script replacing the unintended change.

6. The method recited in claim 1, the method further comprising:
   locking the live database table prior to updating the live database table; and
   unlocking the live database table after updating the live database table.

7. The method recited in claim 1, wherein merging each of the updated entries from the staging table to the live database table comprises applying a merge policy.

8. The method recited in claim 1, wherein the merge policy identifies one or more conditions under which to copy an entry from the staging table to the live database table.

9. The method recited in claim 1, wherein the merge policy identifies an entry if a collision is detected between a live database table entry and a staging table database entry.

10. The method recited in claim 1, the method further comprising:
    deleting one or more rows from the live database table prior to updating the live database table.

11. The method recited in claim 1, the method further comprising:
    prior to updating one or more entries in the staging table, restoring the live database table based on the snapshot.

12. The method recited in claim 1, wherein the live database table is stored in a multitenant database, the live database table including a plurality of rows, each row being associated with an organizational identifier that identifies a tenant associated with data stored in the row.

13. The method recited in claim 1, wherein the live database table is stored in a dynamic schema database, the live database table including a plurality of rows, each row being associated with a respective entity definition that defines one or more data types for column values associated with the row, at least two of the rows being associated with different entity definitions.

14. A database system implemented on a computer system, the database system comprising:
    a live database table storing data that has been updated by a sequence of changes;
    a communication interface configured to receive a message identifying a designated one of the changes as unintended;
    a staging table created upon receiving the message to store a snapshot of the live database table, the snapshot of the live database table being captured prior to the unintended change to the live database table; and
    a processor configured to update one or more entries in the staging table to incorporate one or more intended changes to the live database table that occurred after the unintended change and to update the live database table by merging each of the updated entries from the staging table to the live database table, the updated live database table eliminating the unintended change.

15. The database system recited in claim 14, wherein updating the one or more entries comprises replaying an instruction transmitted via an application procedure interface and associated with one of the intended changes.

16. The database system recited in claim 14, wherein updating the one or more entries comprises executing a database script associated with one of the intended changes.

17. The database system recited in claim 14, wherein the computer system is further configured to:
    determine a logical difference between the live database table and the staging table, the logical difference identifying one or more data rows that differ between the live database table and the staging table.

18. The database system recited in claim 14, wherein the computer system is further configured to:
    apply to the staging table a database branch correction script, the database branch correction script replacing the unintended change.

19. One or more non-transitory computer readable media having instructions stored thereon for performing a method in a database system, the method comprising:

receiving via a communication interface a message identifying a designated change of a sequence of changes to a live database table as unintended;

creating a staging table in the database system upon receiving the message, the staging table storing a snapshot of the live database table, the snapshot of the live database table being captured prior to the unintended change to the live database table;

updating one or more entries in the staging table, the updated entries incorporating one or more intended changes to the live database table that occurred after the unintended change; and updating the live database table by merging each of the updated entries from the staging table to the live database table, the updated live database table eliminating the unintended change.

20. The one or more non-transitory computer readable media recited in claim 19, wherein updating the one or more entries comprises replaying an instruction transmitted via an application procedure interface and associated with one of the intended changes.

\* \* \* \* \*